(12) United States Patent
Dockendorf et al.

(10) Patent No.: US 10,853,738 B1
(45) Date of Patent: Dec. 1, 2020

(54) INFERENCE CIRCUIT FOR IMPROVING ONLINE LEARNING

(71) Applicant: HRL Laboratories, LLC, Malibu, CA (US)

(72) Inventors: Karl P. Dockendorf, Jacksonville, FL (US); David W. Payton, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1191 days.

(21) Appl. No.: 15/196,966

(22) Filed: Jun. 29, 2016

Related U.S. Application Data

(60) Provisional application No. 62/186,169, filed on Jun. 29, 2015.

(51) Int. Cl.
*G06N 20/00* (2019.01)
*G06N 7/00* (2006.01)
*G06N 5/04* (2006.01)

(52) U.S. Cl.
CPC .............. *G06N 20/00* (2019.01); *G06N 5/047* (2013.01); *G06N 5/048* (2013.01); *G06N 7/005* (2013.01)

(58) Field of Classification Search
CPC ........ G06N 20/00; G06N 5/047; G06N 5/048; G06N 7/005
See application file for complete search history.

(56) References Cited

U.S. PATENT DOCUMENTS

| | | | |
|---|---|---|---|
| 6,211,971 B1 * | 4/2001 | Specht | G06T 5/009 345/589 |
| 7,308,134 B2 | 12/2007 | Wersing et al. | |
| 8,832,004 B2 | 9/2014 | Kato et al. | |
| 9,286,524 B1 | 3/2016 | Mei et al. | |
| 2007/0038449 A1 * | 2/2007 | Coifman | G10L 15/065 704/243 |
| 2010/0088492 A1 * | 4/2010 | Chakradhar | G06F 9/4887 712/220 |

OTHER PUBLICATIONS

A. Coates, H. Lee, and A. Ng, "An Analysis of Single-Layer Networks in Unsupervised Feature Learning," Advances in Neural Information Processing Systems, 2010, Appearing in Proceedings of the 14th International Conference on Artificial Intelligence and Statistics (AISTATS) 2011, Fort Lauderdale, FL, USA. vol. 15 of JMLR, pp. 215-223.

* cited by examiner

*Primary Examiner* — Robert A Cassity
*Assistant Examiner* — Tsu-Chang Lee
(74) *Attorney, Agent, or Firm* — Tope-McKay & Associates

(57) ABSTRACT

Described is an inference circuit for pattern recognition for use within convolutional neural nets for online learning using K-means clustering. The inference circuit includes a set of templates, each template having a template data memory. The inference circuit also include at least one match element, the match element being operable for receiving an input data pattern and determining a degree of match between the input data pattern and a template. A best match logic circuit is included for selecting a template in the set of templates that best matches the input data pattern, said template being a best match template. Finally, an updated is included for probabilistically modifying the template data memories based on the best match template.

18 Claims, 6 Drawing Sheets

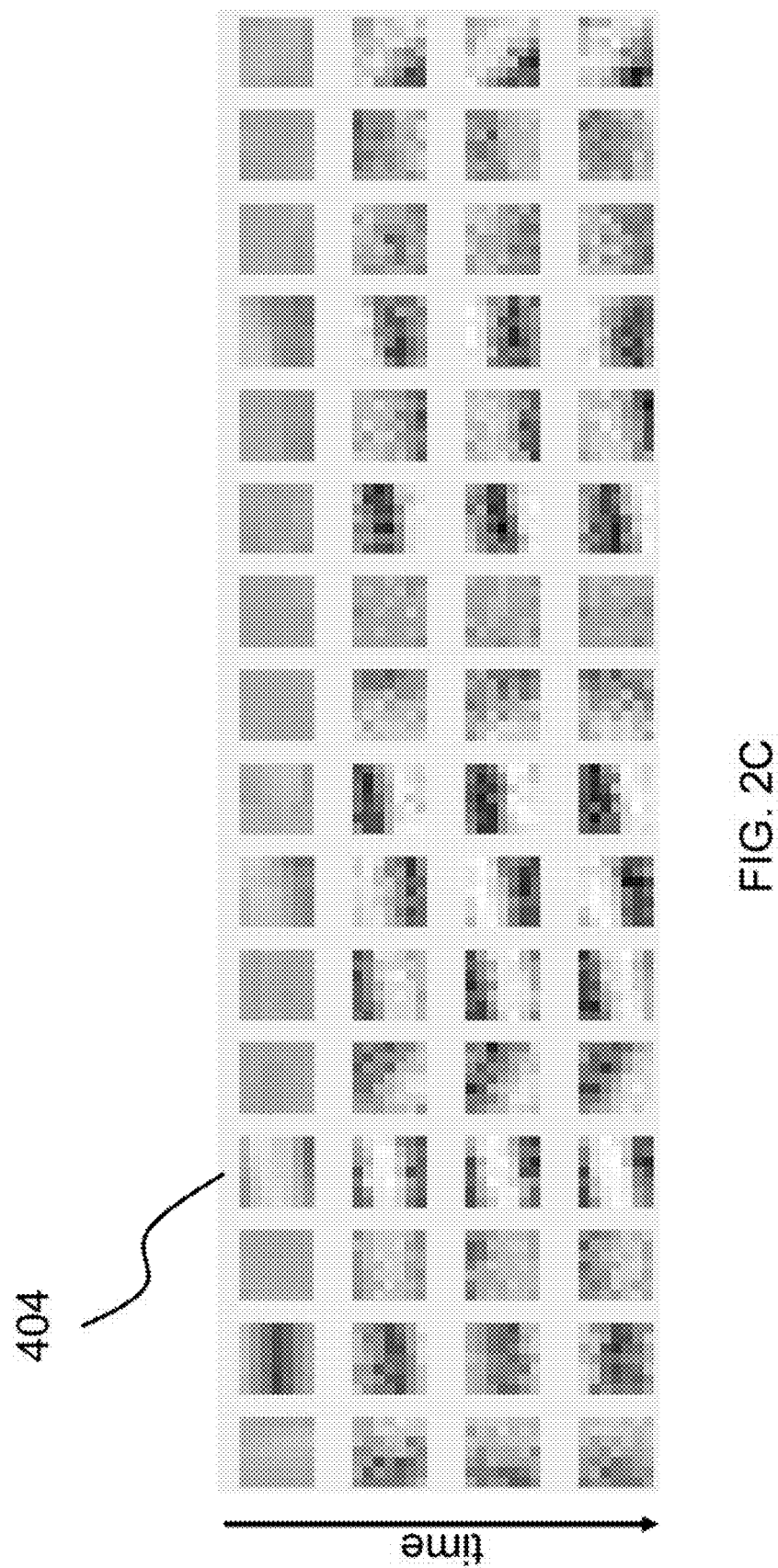

INFERENCE CIRCUIT FOR IMPROVING ONLINE LEARNING

CROSS-REFERENCE TO RELATED APPLICATIONS

This is a non-provisional patent application of U.S. Provisional Application No. 62/186,169, filed on Jun. 29, 2015, the entirety of which is hereby incorporated by reference.

BACKGROUND OF INVENTION

(1) Field of Invention

The present invention relates to a system for recognizing a pattern based on a set of features and, more particularly, to an inference circuit for pattern recognition for use within convolutional neural nets for online learning using K-means clustering.

(2) Description of Related Art

Machine learning is the process of getting computers to act without being explicitly programmed. The field of machine learning has improved over the years, resulting in the development of convolutional neural networks (CNN). A CNN is a biologically inspired, feed-forward neural network in which a connectivity pattern between neurons are arranged such that they respond to overlapping regions tiling a visual field. CNNs are often used in image and video recognition systems and have been the subject of much research and development.

Most CNN systems use backpropagation for adaptation, and in most cases these systems perform this adaptation function in an off-line mode before they are put into use. In such cases, specialized hardware may be used for efficient on-line system operation, while general-purpose hardware is used for training and adaptation. Further, most CNNs are not concerned with limiting the number of bits used in computing convolutions or in storing weights. If they are, this specialized hardware is only used for the on-line version of the system and cannot be used for training or adaptation. In addition to, or as an alternative to backpropagation, some CNNs have been developed to use data clustering, such as K-means clustering for adaptation. In these cases also, there is often no concern about performing these operations with limited bit resolution since they are developed to run on conventional computing hardware.

In many CNN applications, such as use for sensor networks, or object recognition on drones, there is also a desire to minimize the power consumed by the system so that limited power resources, such as batteries, can be conserved as much as possible. In these cases, a CNN may be implemented in specialized hardware to conserve power. One such approach to power conservation is to perform all math operations with integer arithmetic and to use as few bits as possible to represent each stored number. In doing this, the energy consumed by each multiply and add operation can be greatly reduced. However, training and adaptation generally cannot be performed with this same hardware because the bit-resolution requirements of learning algorithms are often different from those of the feed-forward network.

Data clustering is the assignment of objects into groups, or clusters, such that objects within the same cluster are more similar to one another than objects from different clusters. Several data clustering techniques exist in the art; one such technique, known as K-means, requires users to specify the number of desired clusters in advance. The ability to automatically cluster large data sets plays an important role in many applications, non-limiting examples of which include image analysis, data mining, biomedical data analysis, and dynamic network analysis.

Such data clustering also plays an important role machine learning and CNN. In many schemes for machine learning, a learning system is composed hierarchically as a multi-stage or multi-layered system. Each layer in these systems can automatically form feature detectors from streams of input data without the need for pre-categorization of what is in the input data. Typically, the methods for forming such feature detectors can involve a variety of methods such as use of sparse auto-encoders, Restricted Boltzmann Machines, K-means clustering, or Gaussian Mixtures. The net effect of each of these schemes is to find a reduced set of patterns from which the input data can be characterized or regenerated.

While K-Means clustering is common in many machine learning approaches, the standard method involves deterministic updates with a scaling term that grows increasingly smaller with the number of data samples acquired. This introduces two problems when dealing with limited resolution memory. First, with limited bit resolution, the scaling operation can become very noisy. Second, the scale factor will quickly reach a zero value and thus terminate any further learning.

For example, Coates et al. explored a variety of different methods for learning good features from an unlabeled data set (See A. Coates, H. Lee, and A. Ng, "An Analysis of Single-Layer Networks in Unsupervised Feature Learning," Advances in Neural Information Processing Systems, 2010). They found that a K-means clustering method is competitive, if not superior, to a variety of other methods popular in the deep learning literature. This includes sparse auto encoders, Gaussian mixtures, and restricted Boltzmann machines. While the incremental K-means update that Coates used was considered both efficient and simple to update on conventional computing platforms, the method would still be unsuitable for efficient hardware implementation. The disadvantages of this method relate to the resolution and scaling issues with dealing with limited resolution hardware.

Thus, a continuing need exists for a convolutional neural network (CNN) or neural hardware that is capable of operating with reduced bit resolution in both the standard feed-forward mode as well as in the learning or adaptation mode. This can be done with a K-means clustering method that is modified such that updates to cluster centers are performed stochastically rather than deterministically, resulting in a learning system that changes pattern elements probabilistically as a simple increment or decrement limited bit-resolution integer weights. Such a neural hardware implementation should be able to work within constrained hardware implementations where floating-point additions and multiplications are to be avoided, or where only limited bit-resolution memory is available.

SUMMARY OF INVENTION

This disclosure provides an inference circuit for pattern recognition for use within convolutional neural nets for online learning using K-means clustering. The inference circuit includes a set of templates, each template having a template data memory. The inference circuit also include at least one match element, the match element being operable for receiving an input data pattern and determining a degree of match between the input data pattern and a template. A best match logic circuit is included for selecting a template in the set of templates that best matches the input data pattern, said template being a best match template. Finally, an updated is included for probabilistically modifying the template data memories based on the best match template.

In another aspect, the updater randomly modifies each memory element in the template data memory of the best match template by one memory quantization level.

In yet another aspect, the updater randomly modifies each memory element as determined by a probability score that increases in proportion to an absolute value of a difference between a current value stored in the memory element and a corresponding value from the input data pattern.

In another aspect, the probability score is scaled by a number of times the best match template has been updated.

Further, in modifying each memory element, a memory element is incremented when the current value stored is less than the corresponding value in the input data pattern and is decremented when the current value stored is greater than the corresponding value in the input data pattern.

In another aspect, in selecting the best match template, the best match logic circuit identifies a winner take all/degree of match (WTA/DoM) result. The WTA/DoM result is a vector of size equal to a total number of templates in the set of templates. Each element of the vector corresponds to one of the templates in the set of templates, with the values of the elements all being zero except for one element that corresponds to the best match template.

In yet another aspect, the set of templates includes a fixed number of templates $T_i$, which are initialized semi-randomly by choosing i different random samples from the input data and using those samples as the starting values for templates.

In another aspect, the invention includes a system having one or more processors and a memory, the memory having instructions encoded thereon, such that upon execution of the instructions, the system performs the operations described herein. Further, the invention includes a method of performing such operations.

Finally, the present invention also includes a convolution neural net that incorporates the inference circuit and using such an inference circuit.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2C is an illustration depicting an example process of template formation with 16 templates initialized from random patches extracted from the test image as shown in FIG. 2A, where each row moving downward shows the templates progressively forming more distinct light and dark regions to define the features that the templates will match to in an image;

DETAILED DESCRIPTION

Figure 1A:
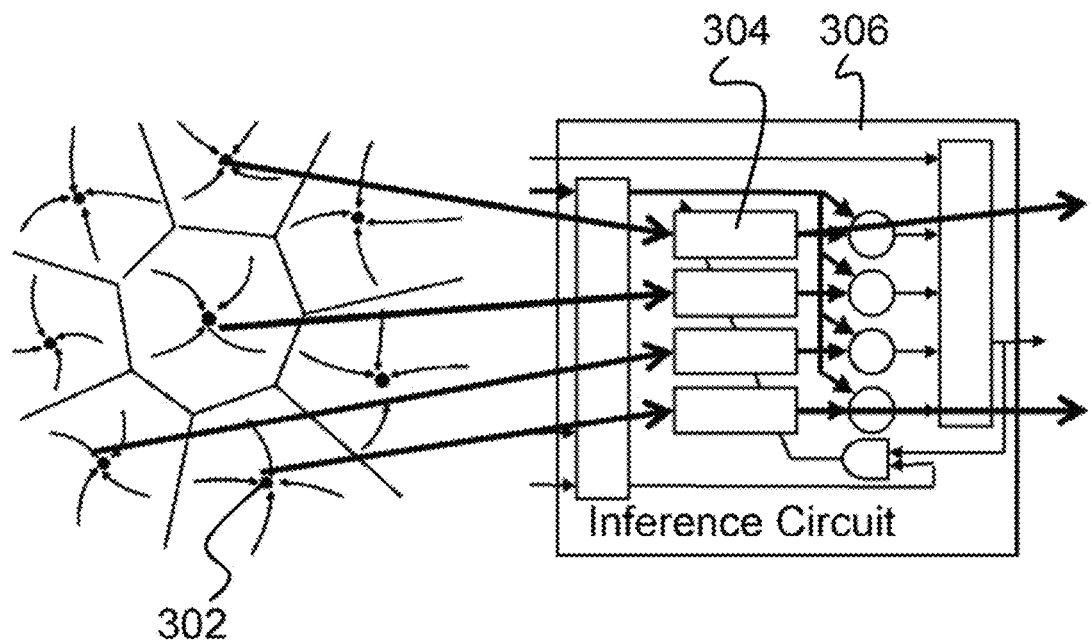
FIG. 1A is an illustration depicting competitive portions of an input space being captured as attractors stored in a template memory.

The present invention relates to a system for recognizing a pattern based on a set of features and, more particularly, to an inference circuit for pattern recognition for use within convolutional neural nets for online teaming using K-means clustering. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention, Finally, specific details of various embodiment of the present invention are provided to give an understanding of the specific aspects.

(1) Principal Aspects

Various embodiments of the invention include two "principal" aspects. The first is a system (e.g., hardware implementation) for improving online learning, a non-limiting example of which includes an inference circuit (e.g., neural hardware) for improving convolution of neural nets for online learning, using, for example, K-means clustering. The inference circuit can be incorporated into a convolutional neural network (CCN) or any other suitable system or device. The hardware implementation can include software or a "hard-coded" instruction set and can include various neural hardware circuits and components as described herein to perform the various features and functions as described. This system may be incorporated into a wide variety of devices that provide different functionalities. Thus, the hardware is in essence a specialized hardware that can be embedded into other systems, such as custom CMOS hardware or a field programmable gate array hardware. In either case, the system or invention can be used when the designer has an option of choosing the number of bits used for representing images or any other input data.

The second principal aspect is a method, typically in the form of software or instructions or processes performed by the neural hardware and circuits and/or other components as described herein. These aspects will be described in more detail below.

(2) Introduction

In many schemes for machine learning, a learning system is composed hierarchically as a multi-stage or multi-layered system. Each layer in these systems can automatically form feature detectors from streams of raw input data without the need for pre-categorization of what is in the input data. Typically, the methods for forming such feature detectors can involve a variety of methods such as use of sparse auto-encoders, Restricted Boltzmann Machines, K-means clustering, or Gaussian Mixtures. The net effect of each of these schemes is to find a reduced set of patterns from which the input data can be characterized or regenerated. One aspect of this invention is to provide a modification to the K-means clustering method such that updates to cluster centers are performed stochastically rather than deterministically. Rather than computing a variable change to a feature pattern during learning, the change to pattern elements is made probabilistically as a simple increment or decrement. The probability of making a change is based on the total amount of change that needs to be made, but the actual change is always a fixed amount. This simpler update method can be used under special circumstances where hardware resources are limited and low bit-resolution memory is used.

A purpose of some embodiments of this invention is to make feature learning layers within a learning system able to work within constrained hardware implementations where floating-point additions and multiplications are to be avoided, or where only limited bit-resolution memory is available. An embodiment of a system as described herein improves upon learning systems of the prior art by substituting a simple single-bit increment or decrement for a scalar multiply. It also adds the need for a random number source, which, if implemented digitally, would add significant overhead, but such sources may also be realized in with hardware noise sources.

The process described herein can be applied to give very low power but high performance to state-of-the-art image processing systems and other learning systems by supporting automated feature extraction. The process can also be applied to autonomous driving and active safety. The ability to have multiple cameras surrounding a car, each with its own self-contained low-power object recognition capability could be an advantage for reducing overall communications bandwidth within the vehicle. There are also numerous applications with unmanned air vehicles and persistent surveillance that could benefit from compact self-contained object recognition units. By enabling a low-power hardware solution that has performance comparable to much larger systems, this invention opens the door to many self-contained low-cost object recognition modules that could not otherwise have been achieved.

(3) Specific Details of Various Embodiments

This disclosure provides a learning process for an inference circuit that operates within the framework of a convolutional neural network. For a typical convolutional neural network, there are multiple layers made of alternating layers of convolution and pooling. Within each convolution layer there is an input array which is either the output of the previous pooling layer, or an input image if we are dealing with the first layer. Over this input array, (for example a 256×256 array) the convolution layer scans several (for example 16) relatively smaller convolution templates (each template, for example, being a 7×7 array) over the input array and performs a matching operation between each of the templates and an identically sized portion of the input array. While, as the name suggests, the typical matching operation performed is a convolution, there are other types of distance functions that can also be performed to produce a comparable result. For each matching operation, a numerical result is obtained that is placed into an output array. In the example where 16 templates are used, there will be 16 numerical results placed into 16 different output arrays produced for a single input. Each of these output arrays can be thought of as representing the locations of a particular feature in the input array as defined by a degree of correspondence between those locations of the input array and the associated template.

The focus of some embodiments of this invention is the inference circuit that operates within these convolutional layers to transform the input array into a set of output arrays as well as to automatically adapt the associated templates to become better feature detectors. The adaptive function of this inference circuit operates using a modified form of progressive k-means clustering to automatically modify the templates according to statistical characteristics found in the input array.

For example and as shown in FIG. 1A, the operation of the inference circuit 306 is as follows. Assuming a set of templates 304 of size 7×7, the system can scan the input array in a raster fashion, capturing 7×7 sub-regions of the input array as input to the inference circuit 306. These 7×7 inputs can be thought of as vectors in a 49-dimensional space and each template 304 stored by the inference circuit 306 can be thought of as a point in that same 49-dimensional space. For purposes of illustration, FIG. 1A depicts such a space as a 2-dimensinal space with each template 304 represented notionally as a point 302 in that space surrounded by a Voronoi cell. The input sub-region itself will also be a point in that space and the job of the inference circuit 306 is to determine which Voronoi cell the input lies in, and hence, which template 304 best matches the input. To perform this function, the inference circuit 306 must compute a match score between each template 304 and the input sub-region. This can be done by convolution between each template 304 and the sub-region or by computing an L1 or L2 norm between them (which would be inverted or subtracted from a constant to provide a match score). Using these match scores, the inference circuit 306 can also perform a winner-take-all operation that provides the match score output for only the best matching template, and a zero match score for the others.

For purposes of adaptation, the inference circuit 306 must alter the values in the template arrays, effectively changing the locations of the points 302 within their 49-dimensional space. This is done using the stochastic k-means learning rule as described later. When a given layer is set into learning mode, an adapt-enable signal will be sent to the inference circuit 306 or circuits for that layer. When this happens, the inference circuit 306 will use its existing templates to compute a best match or winner. It will then compare that winning template with the input that it matched to and modify the cells of that template to be slightly closer to the input. If we think in terms of the Voronoi cells, each input can be seen as a point within one of the existing Vornoi cells. Once the cell is determined, adaptation moves the center point 302 for the cell slightly closer to the input location in that space.

Figure 1B:
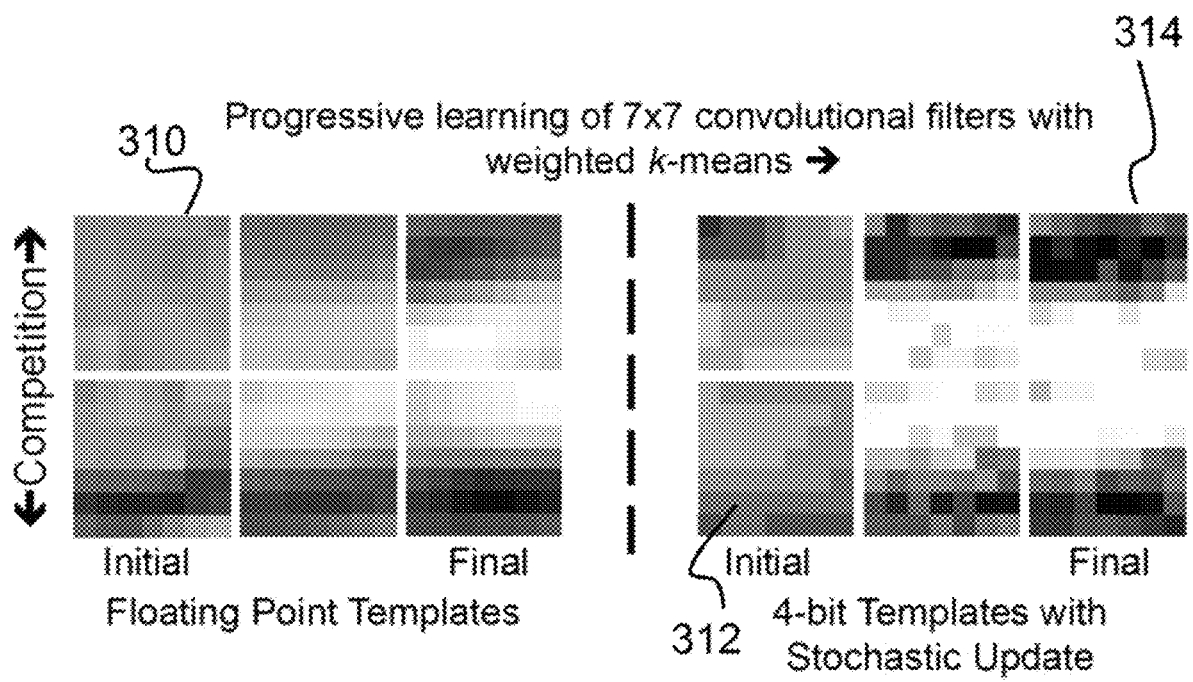
FIG. 1B illustrates simulation results from a pilot study showing the learning of two example 7×7 pixel templates from a locally normalized gray scale image using the system according to various embodiments of the present invention.

Using the process described herein, FIG. 1B illustrates simulation results from a pilot study showing the learning of two example 7×7 pixel templates from locally normalized gray scale images 310 and 312. The left half of this figure depicts the adaptation process for a conventional progressive k-means method while the right hand side of the figure depicts the adaptation for the process used in this invention. The progression of learning and self-organization of edge detectors can be seen. The far right column 314 shows simulation results using stochastic template updates with an effective number of bits (ENOB) being 4.

The theoretical basis of k-means is computationally difficult (NP-Hard). Luckily, a simple approximate implementation called progressive k-means provides an implementation that does not require a large memory or complex calculations. The progressive k-means equation is simply:

$$\overline{T}_i = \overline{T}_i + \frac{1}{N_i}(\overline{X} - \overline{T}_i)$$

where $T_i$ is the closest matching template to input data X and $N_i$ is the number of previous matches. This invention modifies the above equation to use a fixed learning rate instead of the $$\frac{1}{N_i}$$

term for three reasons. First, inverse scaling in hardware is difficult, expends more resources, and is highly noisy. Second, low power mixed signal CMOS limits the ENOB, which would mean very few updates before the scaling term rounds to zero. Third, it is preferable to give recent updates more weight so that low-level representations can gradually change as teaming progresses. This modification is, in fact, closer to the update scheme neural systems use. The resulting algorithm is hardware efficient and works with very low ENOB by using a stochastic update.

(3.1) Implementation

The stochastic k-means learning rule differs from standard progressive k-means by updating closest matching templates $T_i$ probabilistically rather than deterministically. The process begins with a fixed number of templates $T_i$, which are initialized semi-randomly, for instance by choosing i different random samples from the input data and using those samples as the starting values for templates. To learn the templates, input data samples are processed one at a time and as above, the difference matrix $\overline{D}=(\overline{X}-\overline{T}_i)$ is computed for whichever template $T_i$ that best matches input data X. Unlike the deterministic method, however, the method of this disclosure does not scale changes to $T_i$ according to the magnitude of these differences. Instead, any changes to the elements of $T_i$ either increment or decrement corresponding values in $T_i$ by a single quantization level. These changes are determined as follows. First, an increment probability is determined for each positive element of D and a decrement probability is determined for each negative element of D. Then, the template is updated by stochastically incrementing or decrementing one step according to the determined probabilities. In other words, a memory element is incremented when the current value stored is less than the current corresponding value in the input data pattern and it is decremented when the current value stored is greater than the current corresponding value in the input data pattern, but the increment or decrement of any given cell does not always occur. Instead, each cell is incremented or decremented probabilistically according to the degree of mismatch between the input and template for that cell.

The probabilities may be established in either of two ways. The first way is to apply a fixed scale factor to the elements of D. This scale factor must ensure that all resulting values remain in the range of −1 to 1. A second method is to scale the values of D by a variable scale factor that is proportional to the inverse of the number of times template $T_i$ has been a winner. Here, the system maintains a count for the number of times the template is matched to a pattern, and divides the scale factor by that count. The net effect of this second method is to gradually reduce the changes that are made to a template as it is found to match repeatedly to input data. After multiplying D by the scale factor, their absolute value is then used to obtain probability scores between 0 and 1.

With probability scores computed, a random update bit for each probability score is then computed such that the likelihood of obtaining a 1 is proportional to the magnitude of the probability score. These update bits are then segregated into an increment matrix and a decrement matrix where members of the increment matrix correspond to the positive values of D and members of the decrement matrix correspond to negative values of D. $T_i$ is then modified by incrementing elements of $T_i$ corresponding to nonzero elements of the increment matrix and decrementing elements of $T_i$ corresponding nonzero elements of the decrement matrix.

The above method also depends on having a method to obtain the best match template to each input data sample. There are numerous methods for this. Most common are methods involving finding the template which has the minimum distance between itself and the data. Distance can be computed with an L1 or L2 metric based on the difference between a template and the data. The L1 metric simply sums the absolute values of differences between each element. The L2 metric involves summing the squared differences. Empirical results indicate that the exact choice of distance measure used to determine the closest matching template is not critical. However, performance of the method does improve if the difference values are first adjusted by first subtracting from them the mean of all differences, which removes any DC offset.

Figure 2A:
FIG. 2A is an illustration of a test image.
Figure 2B:
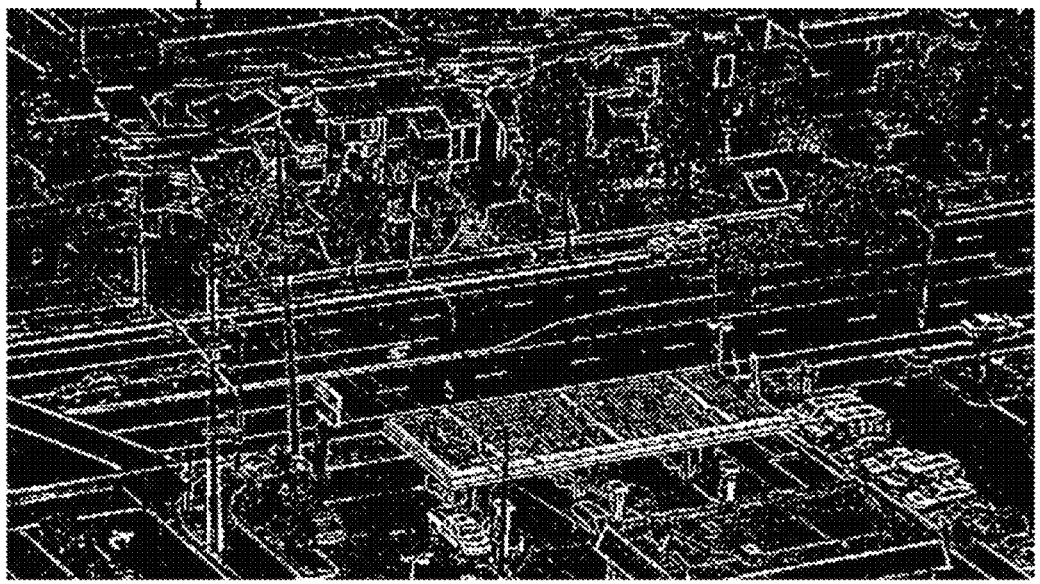
FIG. 2B is an illustration of the test images as converted to a gray scale image.

FIGS. 2A through 2C shows how templates are automatically learned from random patches extracted from a sample image. FIG. 2A provides an illustration of a test image 400, with FIG. 2B depicting the test image as first being converted to decorrelated or whitened gray scale image 402. The gray scale image 402 is then processed to form 16 templates that are initialized from random patches in the gray scale image 402. The templates 404 are shown in FIG. 2C, which illustrates how each row moving downward shows the templates progressively forming more distinct light and dark regions. These patterns define the features that the templates will match to in an image (e.g., when used for object recognition in video or image analysis). This example uses the stochastic update method with an L1 matching metric with DC offset adjustment, uniform update weight, and 4 bit per pixel templates. Here, 16 templates were used for purposes of an example; an actual inference circuit may use more or fewer templates. The progression of four rows is also for purposes of an example as these represent four different moments in time during the training process of adapting the templates based on inputs. There are actually many more actual training updates that took place to reach these four stages of adaptation.

(3.2) Hardware Application

Figure 3:
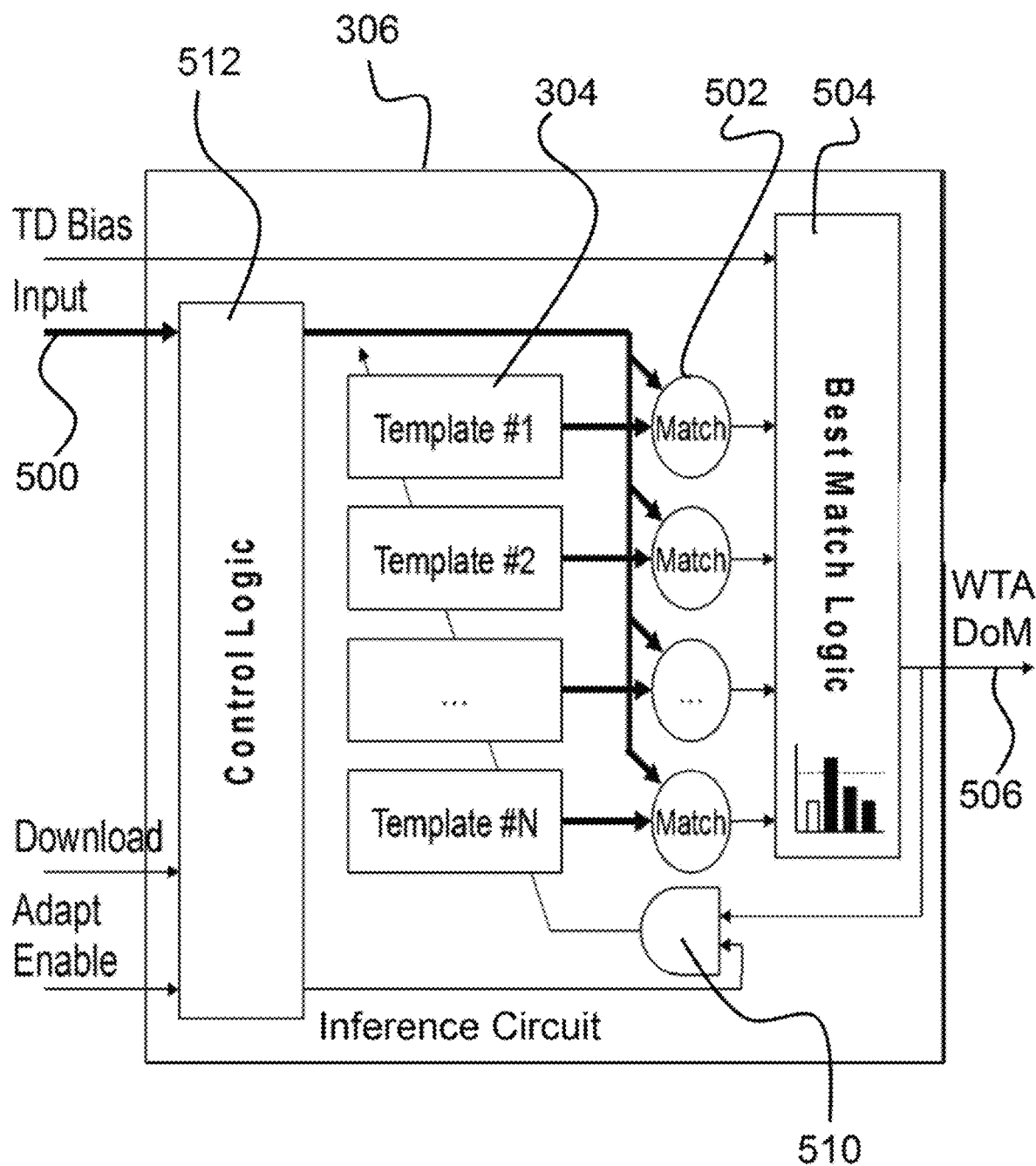
FIG. 3 is an illustration depicting circuit components for selecting a best between input data and a set of template memories.

As stated above, a particular benefit of this disclosure is in the context of hardware implementations that need to avoid the complexity of inverse scaling computations or that have a small effective number of bits for the template memories. FIG. 3 shows an example inference circuit 306 that can be used to match an input pattern to 1 of N templates using the method of this disclosure. The role of the invention in this circuit 306 would be to allow the templates 304 to be automatically learned so that they can provide a way to cluster the available input data into N distinct categories. As shown in this circuit 306, there is a set of templates 304 (having template data memories) and a corresponding set of match elements 502 that determine the degree of match between input data 500 and the template 304 data. As a non-limiting example, the input data will be an array which is a sub region of the input image. The size of this array will be the same size as each template, so if each template is a 7×7 array, the input data will be a 7×7 sub-image of the input image. Each match element 502 determines the degree of match between the input data and its associated template contained in the template memory. This degree of match may be computed in a number of different ways. One way may be to compute a dot-product between the input data elements and the template memory elements. Another way may be to compute a L1 or L2 distance between the input data and the template data, but then to subtract this result from a constant value so that the smallest distance gives the largest match score.

There is also a best match logic circuit 504 that selects the best match result from the array of match elements 502 and identifies the "Winner Take All" (WTA)/Degree of Match (DoM) match result 506. The WTA/DoM match result 506 is a vector of size equal to the total number of templates, where each element of this vector corresponds to one of the templates, and the values of these elements are all zero except for the one element that corresponds to the best matching template. The value assigned to this one nonzero element will be the match score computed for that corresponding template. Alternately, the WTA/DoM match result 506 can simply be an index that indicates which template had the best match paired with the match score for that template.

Thus, the best match as determined by the best match logic circuit 504 is, for example, a 16-element vector with only one non-zero element. If the fourth template has the largest match score compared to all others for a give input, then the one non-zero element of the output will be the fourth element, and the value of that element will be the match score obtained from matching the fourth template with the input.

The components of the inference circuit 306 may be comprised of either digital or analog circuitry. For instance, the match circuits 502 might perform an analog match operation between an analog representation of the input 500 pattern (e.g., image patch) and an analog representation of the template 304 data. Digital match circuits are also feasible. The template 304 memories themselves might be either digital or analog memories. If analog memories are used, the ENOB of the memory is related to the number of distinct analog levels that are available in the memory. Since most analog memories, such as those made from memristor arrays, have a rather small number of such levels, an approach like that of the disclosed invention is of particular importance.

In the inference circuit 306 as shown, the circuit 306 would operate in one of two modes. It would either be set to initialize and learn the template memories (by adapt enable being set high) or it would be set to use learned templates to detect features in the input data (by adapt enable being set low). During the learning mode, the circuit 306 would operate by first initializing the template 304 memories from input 500 data. This is done by selecting different random sub-regions over the input image and then setting the "Download" signal high. As an example, with 16 different templates, there will be 16 different sub-regions selected and the control logic 512 will sequence the initialization of the template 304 memories accordingly with each time the Download signal is set high. Then, while the "adapt enable" signal is high, the system would progressively update the template 304 memories. This is update is performed by the logic circuit 510 for each new input. Logic circuit 510 determines from the WTA output which template to update. The template to update will be chosen to be the same template corresponding to the WTA nonzero element. The template update procedure will be as described above, where a probabilistic measure is used to decide whether to increment or decrement elements of the template memory according to how they compare to the input.

When the "adapt enable" signal is set low, then the inference circuit 306 would operate in a standard feed-forward mode. In this case, the template memories remain fixed and the winner-take-all output is computed without any alteration to these memories. The additional input "TD Bias" is available to provide a bias offset to remove any DC bias from the match results as described earlier.

When the inference circuit 306 is operated as an element of a convolutional neural network, there will be one or more distinct inference circuits used at each convolutional layer of the network. During the teaming phase, the layers will be trained one layer at a time, with the layers closest to the raw input data being trained first. This allows the low-level features to be learned first, and then successive higher layers learn compound features from the lower-level features.

Each time a new data vector is received (via the input 500), a match for each template 304 is computed (by the match elements 502) and a winner is determined (by the best match logic circuit 504). The updater 510 then takes the difference between the winning template and the input 500 data to determine stochastic increment and decrement matrices. From these matrices, the winning template is then modified by incrementing or decrementing template elements corresponding to the nonzero elements of these matrices.

For further understanding, provided below is a non-limiting example as applied to the inference circuit 306 of FIG. 3. The system, for example, receives as input a video image (which has already been converted to gray scale). A sub-region of size 7×7 is then scanned over this image to obtain inputs 500 which are processed by the inference circuit. During training, a random set of these sub-regions are selected and stored in the template memories. If there are 16 template memories used, then 16 different sub-regions of the input image are chosen randomly to provide the initial values of these templates. Alternatively, the templates 304 can simply be initialized with completely random values. Once the templates 304 are initialized, each new image is scanned by the sub-region (as is standard for a convolutional network), and this set of sub-region inputs is provided to the inference circuit 306. For each sub-region input, a WTA result is computed and, with the "adapt enable" signal set to high, the appropriate one out of 16 templates is updated using our probabilistic method. After many such updates, all of the templates 304 should have had a chance to be updated and we should have a set of templates 304 that can be considered distinct from one another and capable of performing feature extraction. At this stage, the "adapt enable" is set low for that layer. At this point, the first layer outputs will become an input pattern for the next layer. This input is no longer standard image, but instead, a set of feature images that scanned in a manner similar to the original input image. Many existing examples describe the mapping of these feature images into the next convolutional layer, which in this case, is another set of inference circuits 306. This next set of inference circuits 306 is trained in a manner similar to the first set, and once these are trained, the following set of inference circuits 306 may be trained from their outputs.

Figure 4:
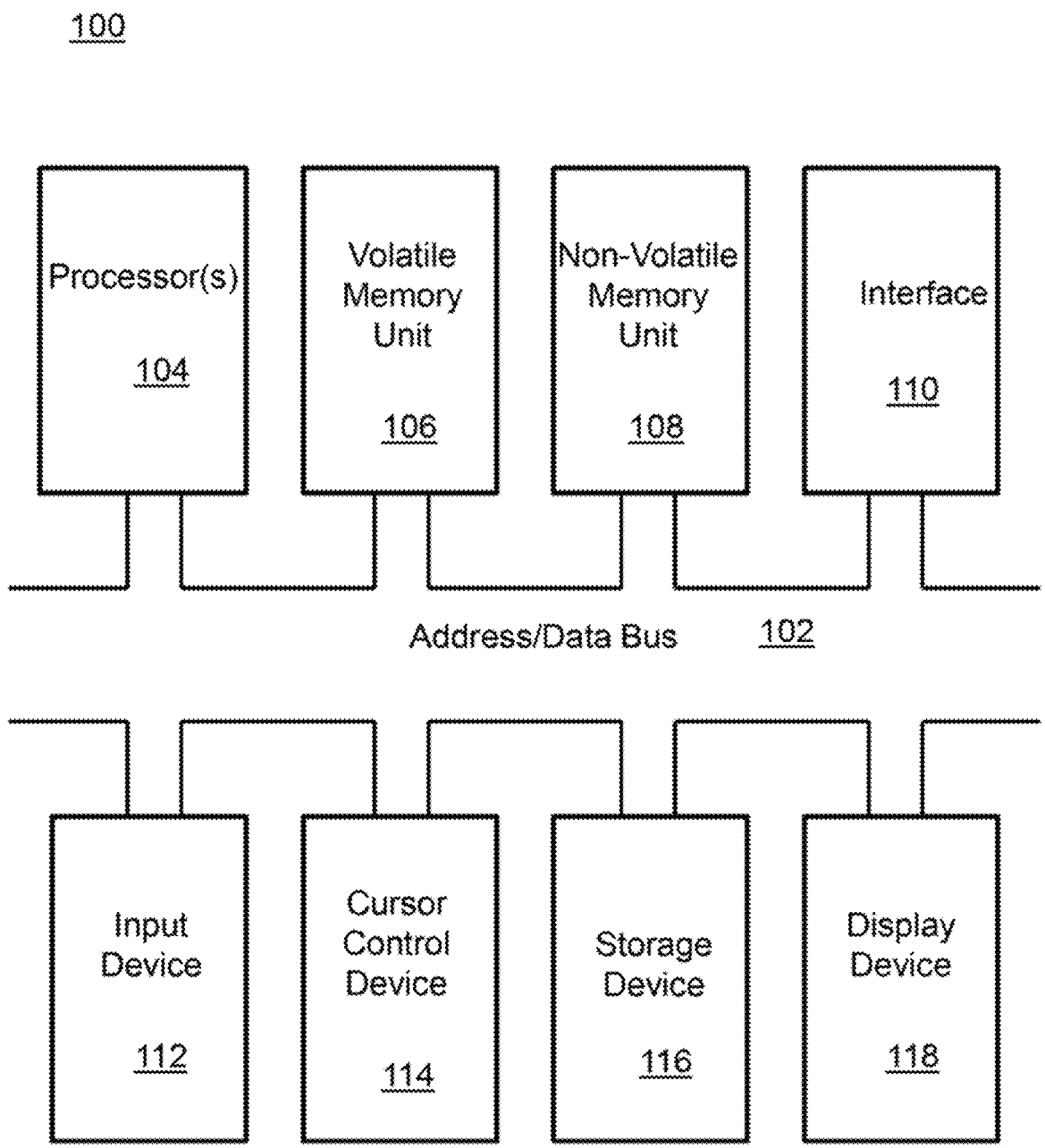
FIG. 4 is a block diagram depicting the components of a system according to various embodiments of the present invention.

As noted above, the inference circuit 306 can be incorporated into a convolutional neural network (CCN) or any other suitable system or device. As a non-limiting example, the inference circuit 306 and/or its processes can be incorporated into an imaging processing system or objection recognition system, or any other suitable implementation that includes performing a variety of operations using a computer system. A block diagram depicting an example of a system (i.e., computer system 100) incorporating such an inference circuit or performing the processes or operations is provided in FIG. 4. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
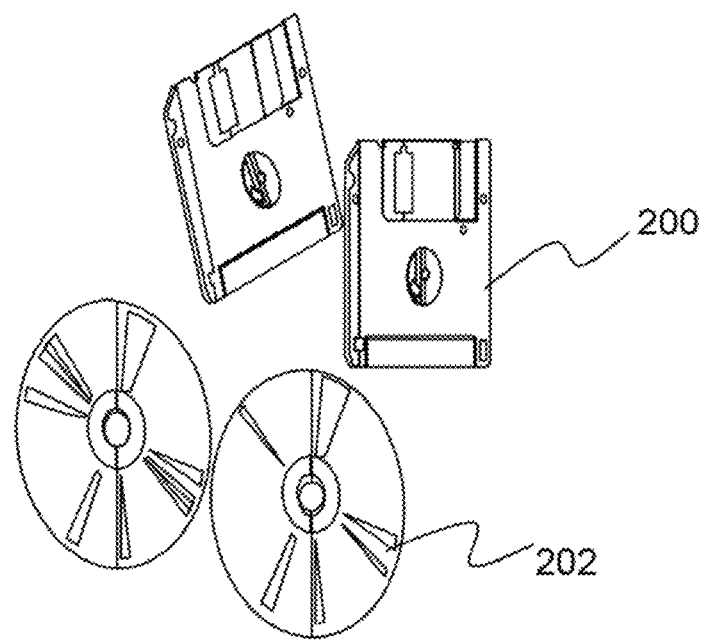
FIG. 5 is an illustration of a computer program product embodying an aspect of the present invention.

An illustrative diagram of a computer program product (i.e., storage device) embodying an aspect of the present invention is depicted in FIG. 5. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An inference circuit for improving learning, the Inference circuit comprising:
   a set of templates, each template having a template data memory;
   at least one match element, the match element being operable for receiving an input data pattern and determining a degree of match between the input data pattern and a template;
   a best match logic circuit, the best match logic circuit operable for selecting a template in the set of templates that best matches the input data pattern, said template being a best match template; and
   an updater, the updater operable for randomly modifying each memory element in the template data memory of the best match template by one memory quantization level.

2. The Inference circuit as set forth in claim 1, wherein the updater randomly modifies each memory element as determined by a probability score that increases in proportion to an absolute value of a difference between a current value stored in the memory element and a corresponding value from the input data pattern.

3. The inference circuit as set forth in claim 2, where the probability score is scaled by a number of times the best match template has been updated.

4. The inference circuit as set forth in claim 3, wherein in modifying each memory element, a memory element is incremented when the current value stored is less than the corresponding value in the input data pattern and is decremented when the current value stored is greater than the corresponding value in the input data pattern.

5. The inference circuit as set forth in claim 4, wherein in selecting the best match template, the best match logic circuit identifies a winner take all/degree of match (WTA/DoM) result, the WTA/DoM result being a vector of size equal to a total number of templates in the set of templates, where each element of the vector corresponds to one of the templates in the set of templates, with the values of the elements all being zero except for one element that corresponds to the best match template.

6. The inference circuit as set forth in claim 1, wherein the updater randomly modifies each memory element as determined by a probability score that increases in proportion to an absolute value of a difference between a current value stored in the memory element and a corresponding value from the input data pattern.

7. The inference circuit as set forth in claim 6, where the probability score is scaled by a number of times the best match template has been updated.

8. The inference circuit as set forth in claim 6, wherein in modifying each memory element, a memory element is incremented when the current value stored is less than the corresponding value in the input data pattern and is decremented when the current value stored is greater than the corresponding value in the input data pattern.

9. The inference circuit as set forth in claim 1, wherein in selecting the best match template, the best match logic circuit identifies a winner take all/degree of match (WTA/DoM) result, the WTA/DoM result being a vector of size equal to a total number of templates in the set of templates, where each element of the vector corresponds to one of the templates in the set of templates, with the values of the elements all being zero except for one element that corresponds to the best match template.

10. The inference circuit as set forth in claim 1, wherein the set of templates includes a fixed number of templates $T_i$, which are initialized semi-randomly by choosing i different random samples from the input data and using those samples as the starting values for templates.

11. A system for improving learning, the system comprising:
    one or more processors and a memory, the memory having executable instructions encoded thereon, such upon execution of the instructions, the one or more processors performs operations of:
    determining a degree of match between an input data pattern and a template with a set of templates, each template having a template data memory;
    selecting a template in the set of templates that best matches the input data pattern, said template being a best match template; and
    randomly modifying each memory element in the template data memory of the best match template by one memory quantization level.

12. The system as set forth in claim 11, wherein probabilistically modifying the template data memories further comprises an operation of randomly modifying each memory element as determined by a probability score that increases in proportion to an absolute value of a difference between a current value stored in the memory element and a corresponding value from the input data pattern.

13. The system as set forth in claim 12, where the probability score is scaled by a number of times the best match template has been updated.

14. The system as set forth in claim 12, wherein in modifying each memory element, a memory element is incremented when the current value stored is less than the corresponding value in the input data pattern and is decremented when the current value stored is greater than the corresponding value in the input data pattern.

15. The system as set forth in claim 11, wherein selecting the best match template further comprises an operation of identifying a winner take all/degree of match (WTA/DoM) result, the WTA/DoM result being a vector of size equal to a total number of templates in the set of templates, where each element of the vector corresponds to one of the templates in the set of templates, with the values of the elements all being zero except for one element that corresponds to the best match template.

16. The system as set forth in claim 11, wherein the set of templates includes a fixed number of templates $T_i$, which are initialized semi-randomly by choosing i different random samples from the input data and using those samples as the starting values for templates.

17. The system as set forth in claim 11, wherein the system is an image processing system, with system receiving a video image, with a sub-region of the video image being scanned and provided as the input data pattern.

18. A method for improving learning, the method comprising acts of:
- determining, with a match element, a degree of match between an input data pattern and a template with a set of templates, each template having a template data memory;
- selecting, by a best match logic circuit, a template in the set of templates that best matches the input data pattern, said template being a best match template; and
- randomly modifying, by an updater, each memory element in the template data memory of the best match template by one memory quantization level.

* * * * *